(12) United States Patent
Tages et al.

(10) Patent No.: US 7,421,073 B2
(45) Date of Patent: Sep. 2, 2008

(54) PLASTIC MOUNT SYSTEM FOR CELLULAR PHONE OR PERSONAL ELECTRONIC DEVICE ATTACHMENT

(75) Inventors: Fernando Tages, Coral Springs, FL (US); Harold A. Goradesky, Fort Lauderdale, FL (US)

(73) Assignee: A.G. Findings & Manufacturing Company, Inc., Sunrise, FL (US)

( * ) Notice: Subject to any disclaimer, the term of this patent is extended or adjusted under 35 U.S.C. 154(b) by 698 days.

(21) Appl. No.: 11/156,861

(22) Filed: Jun. 20, 2005

(65) Prior Publication Data

US 2005/0232413 A1    Oct. 20, 2005

Related U.S. Application Data

(63) Continuation-in-part of application No. 10/791,128, filed on Mar. 2, 2004, now Pat. No. 7,369,656.

(60) Provisional application No. 60/534,206, filed on Jan. 5, 2004.

(51) Int. Cl.
*H04M 1/00* (2006.01)
(52) U.S. Cl. ....................................... 379/446; 379/454

(58) Field of Classification Search ................. 379/446, 379/450, 454, 455; 224/197, 242, 271; 24/3.11, 24/3.12, 3.13; 455/575.1
See application file for complete search history.

(56) References Cited

U.S. PATENT DOCUMENTS

| 5,597,102 A | 1/1997 | Saarikko et al. ............. 224/197 |
| 5,850,996 A | 12/1998 | Liang .......................... 248/221 |
| 6,283,348 B1 | 9/2001 | Wang .......................... 224/271 |

*Primary Examiner*—Curtis Kuntz
*Assistant Examiner*—Tuan D Nguyen
(74) *Attorney, Agent, or Firm*—Robert C. Kain, Jr.

(57) ABSTRACT

The clip-mount operates with a button sub-mount system and includes a body defining a locking cavity for the button and a resilient locking tongue therein. The tongue biases the button into a locking position with a cam surface. A movable cam actuator on the body includes another cam surface which coacts with the first cam permitting the tongue to flex or unlock. An enhancement includes both an unlocking cam and a second locking cam structure. The method includes biasing the button to a locking position and moving one cam over another thereby flexing the tongue from a locked to a button release position. The actuator maybe biased outboard or upward via a plastic spring on the actuator-plunger. A plastic leaf spring may be provided between a clip arm and the button clip mount body. A lock or latch may lock on the actuator-plunger.

34 Claims, 6 Drawing Sheets

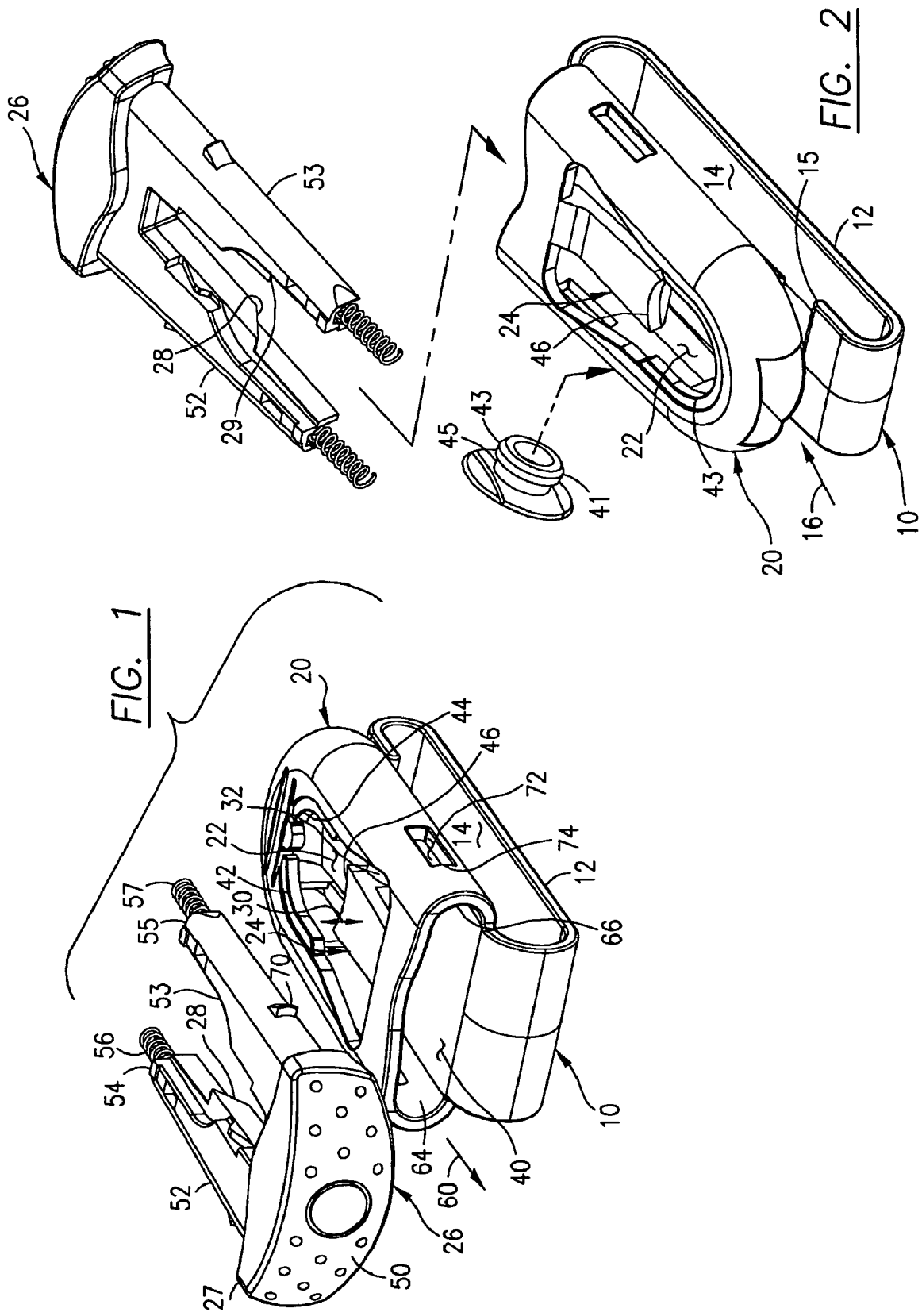

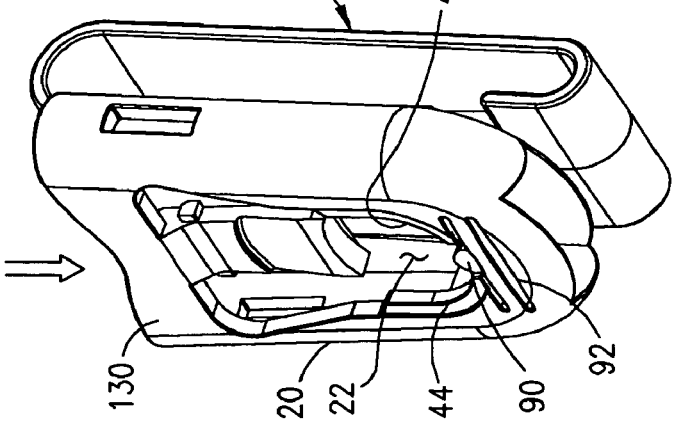
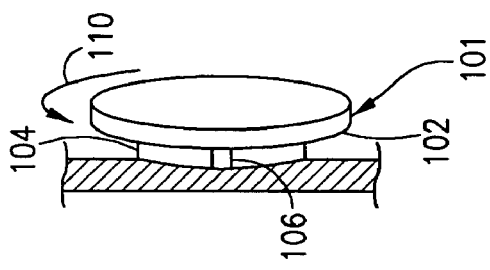
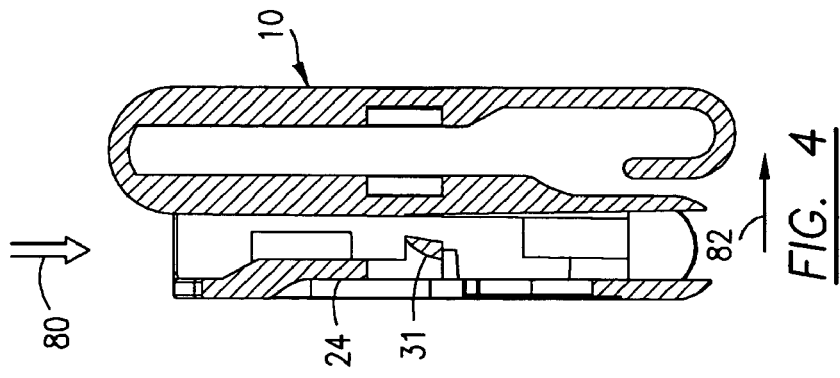
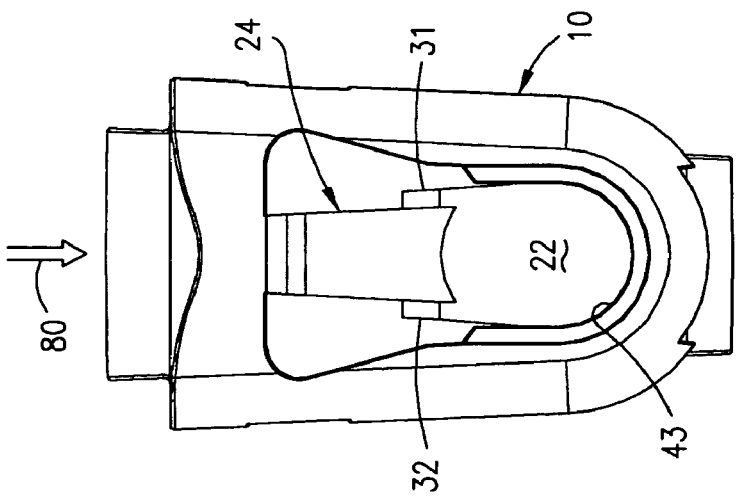

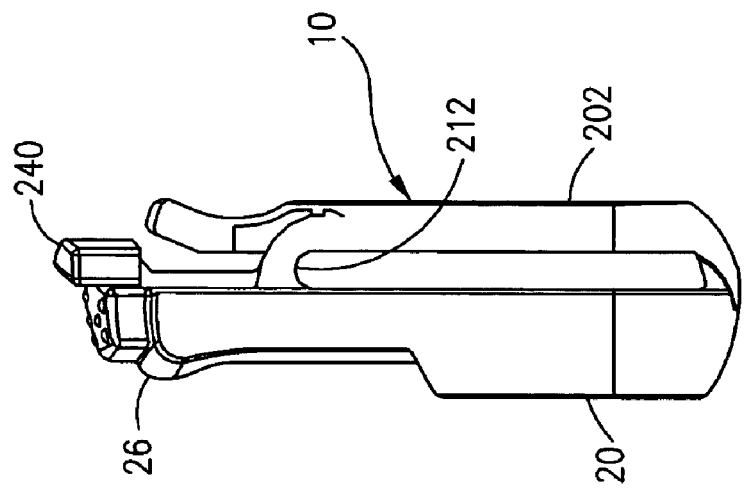
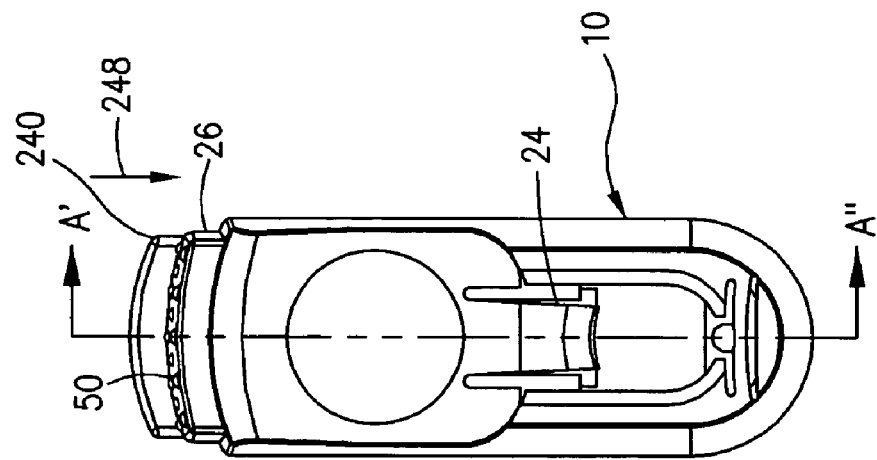
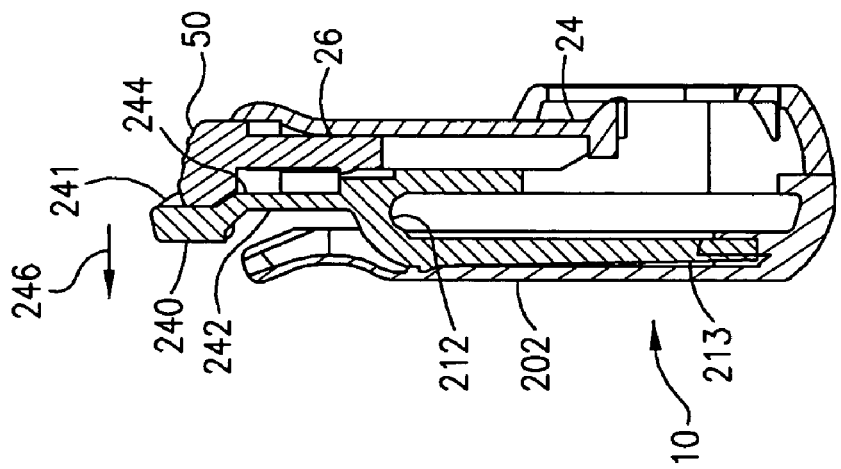

PLASTIC MOUNT SYSTEM FOR CELLULAR PHONE OR PERSONAL ELECTRONIC DEVICE ATTACHMENT

This is a continuation in part patent application based upon and claiming priority from application Ser. No. 10/791,128 filed Mar. 2, 2004, now U.S. Pat. No. 7,369,656 which is a regular patent application based upon and claiming the benefit of provisional patent application Ser. No. 60/534,206, filed Jan. 5, 2004.

The present invention relates to a plastic mount system for a cellular telephone attachment system with a button mount (or a mount for a personal electronic device) and a method therefor.

BACKGROUND OF THE INVENTION

Many cell phone users utilize a clip mount which may be attached to his or her belt, purse or other strap. These clip mount systems coact with a clip-on structure which is removably attached to the generally rectangular body of the cellular telephone. The sub-system attachment to the cellular telephone includes a button which protrudes from the backside of the sub-system. The present invention is a plastic clip mount system for this type of button mount. The following patents describe prior art releasable button mounts: U.S. Pat. No. 5,597,102 to Saarikko (issued Jan. 28, 1997); U.S. Pat. No. 5,850,996 to Liang (issued Dec. 22, 1998) and U.S. Pat. No. 6,283,348 to Wang (issued Sep. 4, 2001).

Due to the decrease in size and weight of personal electronic devices, such as personal digital assistants, MP3 players, and small computers or communicators, these personal electronic devices can also be carried on a user's belt, purse strap, pant pocket or other belt-like structure.

Although "jaw style" belt clips with metal leaf springs are known, the metal adversely effects radiation absorption and possible re-transmission. There is a growing need to eliminate all metal components in these belt clips for cell phones due to the metal's adverse effect on the specific absorption rate (SAR) of radio frequency (RF) energy emitted by the cell phone and potentially directed into the user's body. More specifically, the metal may, in some rare occasions, focus or re-transmit or re-direct the radio frequency energy from the cell phone such that the energy effects the user's body. Presently, Federal Communications Commission (FCC) has regulations which limit specific absorption rates for cellular telephones when such cellular telephones are worn on the body of the user. The same is true regarding personal electronic devices. It is well established that an all plastic belt or strap clip does not have an adverse effect on specific absorption rate of the RF signal and therefore is potentially completely exempt from FCC regulations.

OBJECTS OF THE INVENTION

It is an object of the present invention to provide a clip mount for a cellular telephone attachment system with a button mount or a mount system for a personal electronic device.

It is another object of the present invention to provide a two piece clip mount with a movable actuator that flexes a resilient locking tongue thereby releasing the button from the locking cavity in the clip mount body.

It is a further object of the present invention to utilize first and second cam surfaces which coact together to flex the resilient locking tongue from a locking position to a button release or unlock position.

It is another object of the present invention to provide a movable actuator which, in a rest position, biases the resilient locking tongue into a locking position and, in a release position, biases the locking tongue into an unlock position.

It is an additional object of the present invention to provide an all plastic mount system for cell phones and small, personal electronic devices.

It is a further object of the present invention to provide a plunger actuator with a plastic biasing element.

It is another object of the present invention to provide a lock or latch which prohibits movement of the actuator-plunger until the user releases the latch.

SUMMARY OF THE INVENTION

The clip mount operates with a button mount attachment sub-system affixed or semi-permanently attached to a cell phone or personal electronic device. The clip mount includes a body defining a complementary locking cavity for the button and a resilient locking tongue disposed in the locking cavity. The tongue is adapted to bias the button into a locking position in the locking cavity. The tongue includes at least one cam surface. A movable cam actuator, movably mounted on the body, includes another cam surface which coacts with the first cam surface permitting the resilient locking tongue to flex from a locking position to an unlocking position. An enhancement includes one cam and cam follower to flex the tongue from the locking the unlocking position and a second cam and cam follower to flex the tongue to the locking position. The method of mounting includes biasing the button to a locking position in the locking cavity, providing a sloped cam surface on the resilient locking tongue and moving a second cam surface over the locking tongue cam surface thereby flexing the tongue from a locked to a button release position. Another embodiment of the invention includes a tongue with two cam surfaces, one facing outboard and a second facing inboard. The cam actuator has two actuator surfaces, one coacting with the tongue's outboard surface and the other coacting with the tongue's inboard facing surface. When the actuator is at rest (biased upward), the tongue is biased outward (laterally outward from the locking cavity) by one cam surface (to achieve a locking cam action) and when the actuator is depressed downward, the tongue moves laterally inward due to the other cam surface (to achieve an unlocking cam action). Alternatively, the locking cam system (with the actuator at rest in an upward position) can be used separate from the unlocking cam system.

The actuator maybe biased outboard or upward via a plastic spring. The plastic spring element or elements may be formed in the clip body and designed to coact with the terminal portions of the actuator-plunger. Alternatively, the biasing element may be formed on the actuator-plunger to bias the actuator outboard or upward away from the locking cavity. The utilization of a plastic biasing element and a plastic leaf spring for the belt or strap clip establishes an all plastic mount system.

Another feature of the present invention includes a lock or latch on a spring tab, coacting with a stop surface on the actuator-plunger. The latch and stop surface prohibits downward movement of the actuator-plunger unless the user laterally pushes the latch away from the stop.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates one embodiment of the clip mount showing the actuator member removed from the clip body;

FIG. 2 diagrammatically illustrates another embodiment of the present invention and particularly shows the button mount (the cellular telephone and attachment sub-structure is not shown affixed to the button mount), actuator and clip body;

FIG. 3 is a front elevational view of the clip mount primarily illustrating the resilient locking tongue and the first cam surfaces;

FIG. 4 diagrammatically illustrates a cross-sectional view primarily showing the slope of the first cam surface on the locking tongue;

FIG. 5 diagrammatically illustrates the first embodiment of the invention with a resilient nub to angularly position the phone with respect to the clip mount;

FIG. 6 diagrammatically illustrates the button mount used with the embodiment of the invention shown in FIG. 5.

FIGS. 12A, 12B and 12C diagrammatically illustrate a lock or latch system to control the actuator-plunger.

DETAILED DESCRIPTION OF THE PREFERRED EMBODIMENTS

Figure 7:
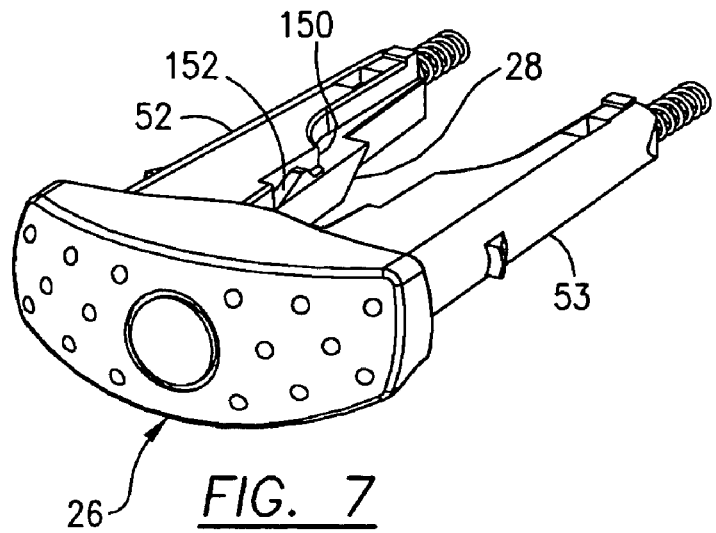
FIG. 7 shows the actuator member with a lower cam actuator surface (for the button release) and shows an upper cam actuator surface that, when the actuator is upwardly biased (a rest position), the upper cam actuator surface acts on an upper tab laterally extending from the tongue (FIG. 8) to bias the tongue laterally outward.

The present invention relates to a plastic mount system for a cellular telephone attachment system having a button mount or a similarly configured mount system for a button sub-system for a personal electronic device and a method of mounting.

FIG. 1 shows one embodiment of clip mount 10 including a belt loop 12 having a belt loop cavity 14 therein. Similar numerals designate similar items throughout all the figures. Belt loop 12, as shown in FIG. 2, has a free end 15 that permits the user to slip a strap or a belt as shown by arrow 16 into belt or strap cavity 14. Alternatively, the user could slip free end 15 inside his or her pants or purse edge and carry the mount system thereon.

Although the figures show a specific manufactured embodiment for the clip mount, other structures may utilize portions of the clip mount 10 invention, which embodiment includes three (3) basic elements which are clip body 20, defining a locking cavity 22, a resilient tongue 24, an actuator 26, and some cam surfaces. Actuator cam surfaces are located on actuator 26 and one of those cam surfaces is numerically identified as cam surface 28. Sometimes, actuator 26 is referred to as an actuator-plunger. Resilient tongue 24 moves or flexes as shown by double headed arrow 30 based upon the position of actuator cam surface 28 and another cam surface complementary thereto. In FIG. 1, a corresponding tongue cam surface 32 is illustrated. FIG. 3 shows resilient locking tongue cam surfaces 31 and 32 and actuator cam surface 28 (FIG. 1) rides along and atop resilient locking tongue cam surface 31. When the actuator cam surfaces 28, 29 (FIG. 2) ride atop the locking tongue cam surfaces 32, 31 (FIG. 3), resilient tongue 24 flexes from a locking position to a button release or unlocking position (laterally inboard flexation) thereby freeing the button from the clip mount 10.

It should be noted that other mechanical structures could accomplish the same features described herein and FIGS. 1-6 show one working embodiment. For example, although actuator 26 is shown as substantially U-shaped with two legs and two cam surfaces, a single movable member with a user actuatable surface and a single cam could operate to move resilient locking tongue 24 from a button locking position to an unlocking position.

Clip body 20 includes a channel cavity 40 into which is movably disposed actuator member 26. A resilient locking tongue 24 is mounted within cavity 40. Locking tongue 24 is adopted to flex or move as shown by double headed arrow 30 in FIG. 21. When a button, such as button 41 in FIG. 2, is placed within locking cavity 22, the button coacts with semi-circular rim member which, in FIG. 1, consists of rim member 42 and rim member 44. Essentially, button 41 includes a peripheral plate 43 and a stem 45. Peripheral plate 43 locks beneath rim elements 43, 44 and resilient tongue 24 includes a terminal edge 46 that coacts with either stem 45 or peripheral plate 43 to securely lock button 41 in locking cavity 22. In general to release button 41 from locking cavity 22, resilient tongue 30 must be flexed generally inboard into channel cavity 40 such that the tongue no longer coacts with stem 45 or plate 43 thereby permitting the removal of button 41 and any attached cell phones or cell phone structure or personal electronic device.

Actuator member 26 includes user actuation surface 50. Actuator member 26 is generally U-shaped consisting of a base 27 and legs 52, 53. The terminal ends 54, 55 of legs 52, 53 define stops. A resilient member, such as springs 56, 57 coact with stop 54, 55 to bias actuation member 26 in a direction shown by arrow 60, that is, in a direction such that resilient locking tongue 24 is in a locking position with respect to button 41. The user depresses surface 50, the actuator moves downward (FIG. 3), the cam surfaces engage and push the tongue laterally inward. Upon removal of the depressing force on surface 50, springs or resilient elements 56, 57 force the actuator back to the original position.

Figures 10, 11:
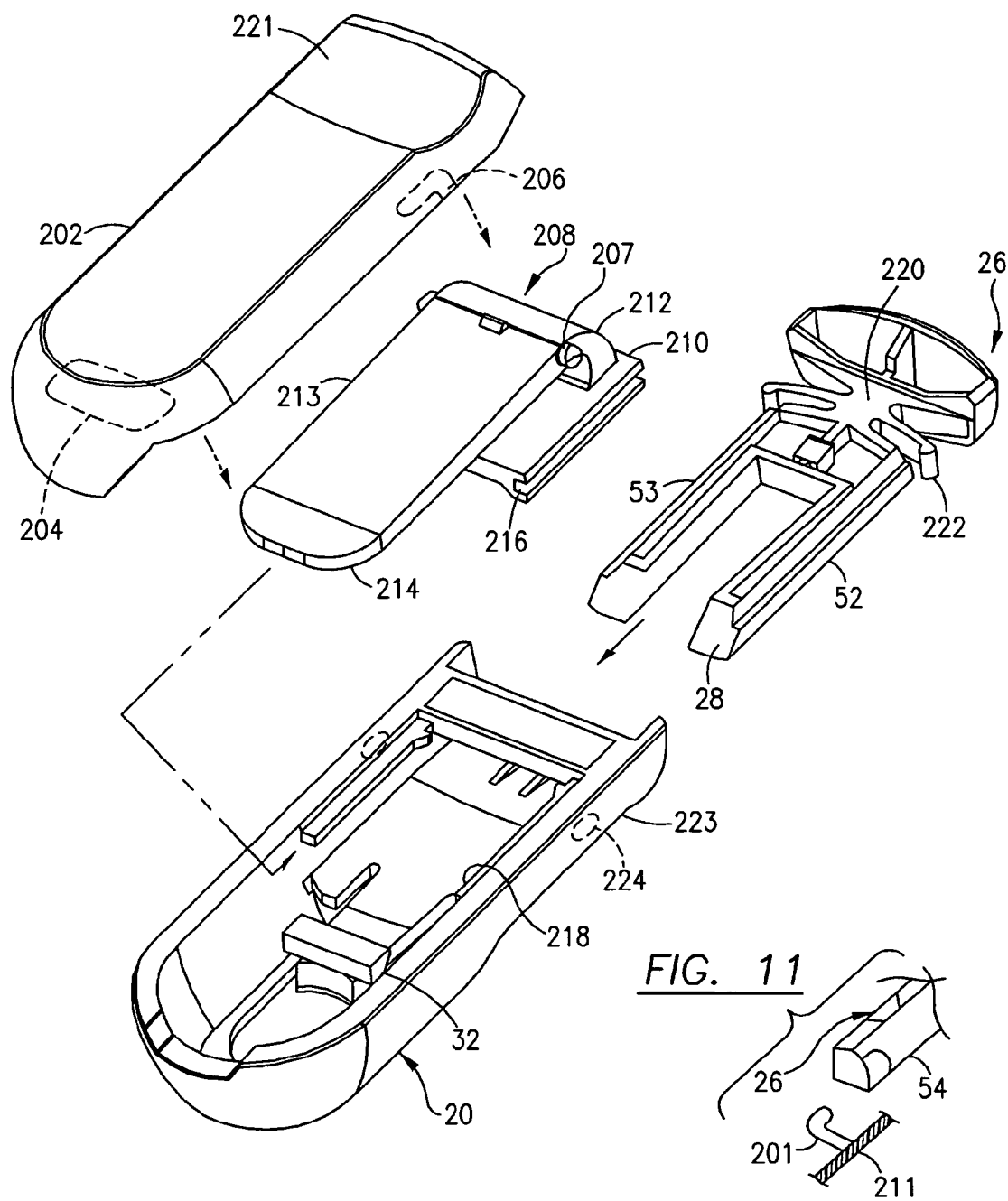
FIG. 10 diagrammatically illustrates a plastic leaf spring between the clip body and a clip arm and the actuator carrying a plastic resilient biasing element (spring element) providing an outboard or upward bias to the actuator.
FIG. 11 diagrammatically illustrates a plastic biasing element operative with the legs or leg of the actuator-plunger (thereby replacing springs 56, 57 in FIG. 1).

FIG. 11 shows that the springs 56, 57 (FIG. 1) can be replaced with plastic resilient biasing element 201 which coacts with terminal leg 54 of actuator 26. The utilization of a plastic spring or resilient element provides an all plastic mount system.

FIG. 2 shows that actuator 26 is positioned in channel cavity 40 and button 41 fits in locking cavity 22. The button is mounted on a cell phone mounting sub-system which is known in the art. Alternatively, a personal electronic device may retain a button mounting sub-system and this sub-system may cooperate with the clip mount system described in detail herein.

In FIG. 1, legs 52, 54 are movably mounted in leg channels 64, 66. Further, once actuator member 26 is disposed in channel cavity 40, actuator member 26 cannot be removed because stop 70 locks within and also moves within side cutout 72. Removal of actuator 26 is prohibited because stop 70 cannot pass edge 74 defining one end of side cutout 72.

FIG. 2 diagrammatically illustrates clip mount 10 in a slightly different embodiment. Rather have two rim segments 42, 44 as shown in FIG. 1, a substantially semi-circular rim 43 defines one side of locking cavity 22. Edge 46 of resilient locking tongue 24 captures the opposite end of button 41. Button 41 is shown as being insertable into locking cavity 22 and actuator 26 is shown as being insertable into channel cavity 40 (not identified in FIG. 2).

FIG. 3 diagrammatically illustrates clip mount 10 and shows cam surfaces 31, 32 on resilient locking tongue 24. Semi circular rim 43 is also shown in FIG. 3. Arrow 80 shows the direction in which actuator 26 is inserted. Actuator 26 moves up and down in the channel cavity 40 after insertion. It should be noted that actuator 26 is utilized in conjunction with the split rim embodiment shown in FIG. 1 and in the single, substantially semi-circular rim embodiment shown in FIG. 2.

FIG. 4 diagrammatically shows a substantially cross-sectional view of clip 10. Particularly, resilient tongue cam surface 31 is shown as either an inclined slope or a gentle curved slope. Since actuator member 26 is inserted in the direction shown by arrow 80, and since cam surfaces 28, 29 (FIG. 2) operate on cam surfaces 32, 31, the depression of actuator 26 causes tongue cam surfaces 32, 31 to move laterally inboard in the direction of arrow 82 in FIG. 4 thereby causing inboard flexation of resilient locking tongue 24. This inboard movement of tongue 24 causes terminal locking surface 46 (FIG. 2) of tongue 24 to disengage button 41 thereby releasing button 41 and any associated structure attached to button 41 from clip mount 10.

FIG. 5 diagrammatically illustrates clip mount 10 in the embodiment shown in FIG. 1. Particularly, rim segments 42, 44 are separated by a resiliently mounted knob 90. Particularly, knob 90 is mounted on a bar 92 spanning left and right sides of clip body 20. Bar 90 flexes and is resilient.

FIG. 6 diagrammatically shows button 101 having a top plate 102 and a stem 104. Stem 104 includes a plurality of notches or cutouts, one of which is cutout 106. Button 101 fits within locking cavity 22. When the cell phone structure (or personal electronic device) attached to button 101 is rotated as shown by arrow 110 in FIG. 6, knob 90 may snap into or lock into notch 106 of button 101. In this manner, the cell phone or clip on element for the cell phone (or device) can be rotated clockwise or counterclockwise about face 130 of clip body 20. Button 41 shown in FIG. 2 does not have notches and rim 43 in FIG. 3 is not split and does not have a resilient knob. However, button 101 may work in conjunction with unitary rim 43. Similarly, button 41 may work in conjunction with split rim 42, 44 provided that knob 90 does not impede the button locking ability of button 41. In this manner, the buttons are inter-changeable but additional functionality is noted with button 101 and resilient knob 90 in FIG. 5.

FIGS. 1-5 diagrammatically illustrate a clip mount wherein, upon depression of actuator member 26, cam actuator surfaces 28, 29 coact with cam follower surfaces 32, 31 (FIG. 3) such that tongue 24 flexes or moves laterally inboard (direction 82, FIG. 4) thereby releasing the button from locking cavity 22.

Figure 8:
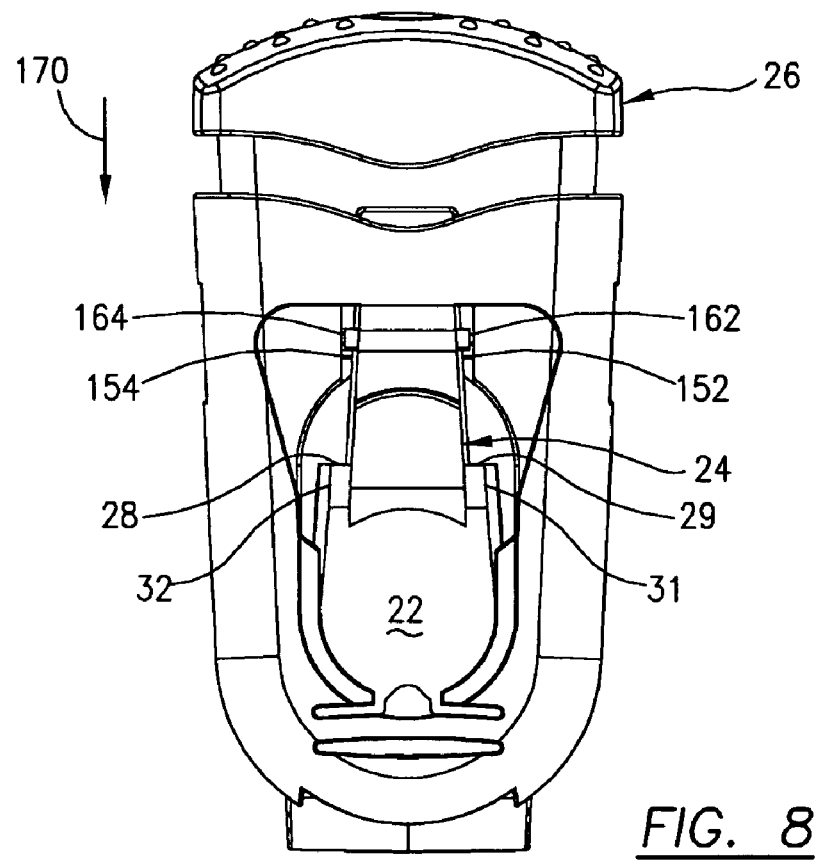
FIG. 8 shows the actuator in the clip-mount body and the laterally extending tabs affected by the upper cam actuator surfaces. When the actuator is depressed down, the lower surface moves the tongue inwards thereby releasing the button from the lip lock—when the actuator is biased upward (see spring in FIG. 2), the actuator biases the tongue laterally outward thereby creating additional locking force or bias on the button 43 (FIG. 2).

In FIGS. 7 and 8, actuator 26 includes locking cam surfaces and unlocking cam surfaces. Unlocking cams are represented by cam actuator surfaces, one of which is surface 28, which is sometimes identified herein as the first cam actuator surface. Locking cams are provided on actuator 26 as cam actuator surfaces 152, 154 in FIGS. 7 and 8. Actuator surfaces 152, 154 coact with second cam follower surfaces 162, 164 which are, in the illustrated embodiment, found on laterally extending tabs protruding from tongue 24. An alternative embodiments, the cam follower surfaces 162, 164 may be formed on the tongue body 24 itself rather than on extending tabs.

FIG. 8 shows actuator 56 in a rest or a button locking position. Further, FIG. 8 shows actuator 26 in a upright or raised position. In this locking or raised position, second cam actuator surfaces 152, 154 bias locking tongue 24 upward (laterally outward from the cavity) thereby providing additional locking force for the button mount adapted to be disposed in locking cavity 24. When actuator 26 is moved downward as shown by arrow 170 in FIG. 8, the locking cam systems 162-152, 164-154 release and the unlocking cams 29, 31 and 28, 32 operate to laterally depress tongue 24 (in a direction 82 shown in FIG. 4) thereby releasing the button mount from locking cavity 22.

FIG. 8 shows the upper and lower cams, the lower cams 29-31, 28-32 are explained in connection with FIG. 2 and the upper cams 162-152, 164-154 cooperate to move the tongue outward when the actuator member is at rest in the common biased position.

Figure 9:
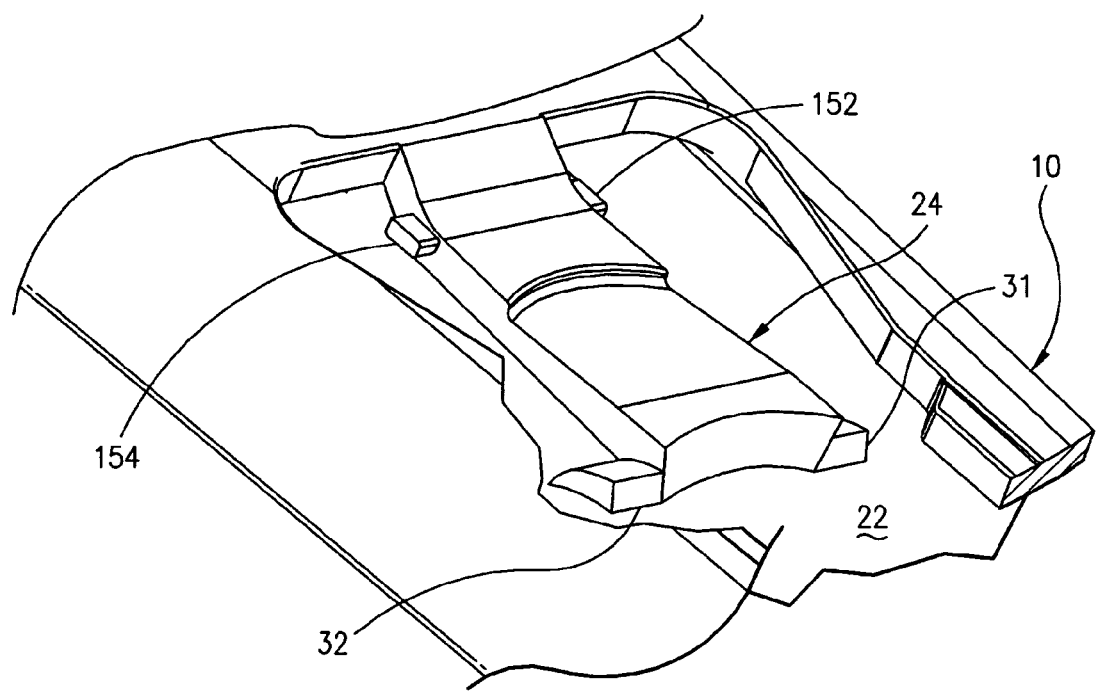
FIG. 9 diagrammatically illustrates a detail, cut-away view of the tongue with the lock cam surfaces and unlock cam surfaces.

FIG. 9 shows a detail, cut-away view of the tongue 24, extending into locking cavity 22. The tongue 24 has, extending transversely from its longitudinal axis, a pair of locking cam follower surfaces 154, 152 and a pair of unlocking cam follower surfaces 32, 31. These follower surfaces track the cam surfaces on the movable actuator. When the actuator (not shown in FIG. 9) is at rest in its biased upward position, the locking cams 154, 152 bias tongue 24 laterally outward from locking cavity 22 thereby additionally locking the button (not shown) in the locking cavity 22. When the actuator is depressed downward, the locking cams release and the unlocking cam system is activated (see cam followers 32, 31) thereby moving tongue 24 laterally inward towards cavity 22. This releases the button from the locking cavity.

It should be noted that the locking cam-cam follower system may be employed separate from the unlocking cam—cam follower system. It should also be noted that the cam and cam followers may be deployed at different locations and on different components than shown in the preferred embodiment.

FIG. 10 diagrammatically illustrates another embodiment of the clip mount 10. The primary differences between clip mount 10 in FIG. 1 and mount system 10 in FIG. 10 are the presence of a plastic leaf spring 208, clip arm 202 (replacing belt loop mount sub-system 12) and plastic resilient biasing element 222 (replacing springs 56, 57). Plastic leaf spring 208 is generally hook shaped with fore end 210, curvaceous midsection 212, elongated leg 213 and distal end region 214. A pivot member 207 is located in a proximal region near the clip arm side of curved member 212. The proximal pivot member 207 (a pivot pin in the illustrated embodiment) fits within L-shaped complementary pivot member 206 configured, in this embodiment, as an L-shaped channel into which is placed, first laterally, and then distally, proximal pivot member 207. Clip arm 202 is plastic and also defines, at a distal end region, capture channel 204. Plastic spring 208, after pivot pin 207 is in bearing channel 206, is moved distally (assuming the clip arm 202 is stationary) such that leg end 214 is retained in capture channel 204. A leg end region may be captured by opposing retaining tabs in clip arm 202.

The fore end 210 of leaf spring 208 defines a mounting system 216 generally consisting of a tongue and groove mount with respect to clip body 20. Specifically, tongue element 218 on clip body 20 coacts and cooperates with groove channel 216 on fore end mount 210. The tongue and groove mount system is locked via opposing inboard tabs at the proximal region of tongue 218 and the opposing, unnumbered tongue on clip body 20. The pivot member system may be reversed such that opposing pivot pins may be disposed on the clip arm 202 and the bearing surfaces may be defined by leaf spring leg 213. Also, the tongue and groove elements 216, 218 may be reversed such that the tongue is disposed on fore end 210 and the groove on clip body 20.

In operation, the user compresses opposing actuator surfaces 221, 223 on clip arm 202 and clip body 20, respectively. Spring 208, and particularly curved member 212, pivots at members 207, 206 and leg 213 bows thereby distributing the torsional stress over both curved member 212 and leg 213.

Actuator 26 is inserted into clip body 20 as explained earlier in connection with FIGS. 1-5. The outboard or upward bias for actuator 26 is provided by opposing plastic resilient elements 222. These spring-like biasing elements 222 extend laterally away from stem member 220 of actuator 26. The terminal ends of elements 222 coact and rest against stops 224 defined within clip body 20. It should be noted that the plastic biasing elements may be configured as a single or a double resilient element protruding from the clip body (see FIG. 11) or resilient elements protruding from the actuator body 26 (either from the stem 220 or from the legs, such as leg 54). It should also be noted that any capture system may be used to retain and restrain the distal end region 214 of leg 213 (leaf spring 208) into clip arm 202.

FIGS. 12A, 12B and 12C diagrammatically illustrate a lock or latch for plunger actuator 26. In some situations and with respect to prior art devices, the user may accidentally depress the actuator-plunger when the user twists or bends over his or her belt. Accidental depression of the actuator results in the release of button 41 and the release of the cell phone or personal electronic device attached to the button sub-system mount. The lock or latch system disclosed and claimed in this patent application eliminates accidental release of the button sub-system mount.

The lock or latch system illustrated in FIGS. 12A, 12B and 12C is discussed concurrently herein. FIG. 12A shows lock or latch tab 240 disposed adjacent actuator-plunger 26 on clip body 20. Clip arm 202 is pivotally mounted via the leaf spring and particularly curved member 212 of that spring to clip body 20. FIG. 12B is a front elevational view indicating that, after the lock-latch 240 is released (described below), actuator 26 is capable of being depressed inboard (downwards) in direction 248.

FIG. 12C is a cross-sectional view from section lines A'-A" in FIG. 12B. Leg member 213 of the leaf spring is shown disposed in clip arm 202. Lock or latch 240 has an upwardly protruding user actuation surface 241, a flexible stem member 242 and a latch surface 244 coacting with an interlock surface on actuator or plunger 50. Stem member 242 is mounted onto body 20. When lock latch 240 is laterally moved in direction 246, latch surface 244 moves away from the interlock surface on plunger actuator 50 and the user is enabled to depress actuator 50 in direction 249. When actuator 50 rises (due to the upward bias of that member), surface 244 locks on the interface due to the counter bias of stem member 242 contrary to direction 246.

It should be noted that many of the mechanical structures described herein may be reversed (tongues and grooves reversed, spring elements and stops reversed, etc.) and the resulting structures fall within the scope and spirit of the claimed invention.

The claims appended hereto are meant to cover modifications and changes within the scope and spirit of the present invention.

What is claimed is:

1. A clip mount for a cell phone or personal electronic device attachment system with a button mount, said clip mount comprising:
    a body defining a complementary locking cavity for said button;
    a resilient locking tongue extending within said body into said locking cavity and adapted to bias said button into a locking position in said locking cavity, said resilient locking tongue having at a cam surface; and
    a cam actuator movably mounted on said body and having a cam actuator surface coacting with said cam surface wherein, in a first actuator position, said resilient locking tongue is adapted to bias said button into said locking position and, in a second actuator position, said cam actuator surface acts on said cam surface and forces said resilient locking tongue out of said locking position to release said button.

2. A clip mount as claimed in claim 1 wherein said cam actuator is biased towards said first position.

3. A clip mount as claimed in claim 2 wherein said body is generally rectangular and said cam actuator is elongated and moves longitudinally in said rectangular body.

4. A clip mount as claimed in claim 3 including a resilient member, disposed between said cam actuator and said body, biasing said cam actuator towards said first position.

5. A clip mount as claimed in claim 4 wherein resilient member is a plastic and said body, tongue and cam actuator are plastic.

6. A clip mount as claimed in claim 5 wherein the entire clip mount is plastic.

7. A clip mount as claimed in claim 4 wherein said resilient member is a flexible leg mounted in said body and said cam actuator includes a stop coacting with said flexible leg.

8. A clip mount as claimed in claim 4 wherein said resilient member is a flexible leg mounted on said cam actuator and said body includes a stop coacting with said flexible leg.

9. A clip mount as claimed in claim 1 including a locking latch between said cam actuator and said body.

10. A clip mount as claimed in claim 9 wherein said locking latch includes a flexible stem mounted to said body and a latch surface, said cam actuator including a latch interface coacting with said latch surface and limiting movement of said cam actuator when said latch interface is adjacent said latch surface.

11. A clip mount as claimed in claim 10 wherein said resilient tongue and said cam actuator are plastic.

12. A clip mount as claimed in claim 10 wherein said body has proximal upper end and a distal lower end, said body is generally rectangular and said cam actuator is elongated and moves longitudinally in said rectangular body, said cam actuator having an actuator proximal end which extends above the body's proximal end, said locking latch having a user actuation surface disposed on said stem which extends above said actuator proximal end.

13. A clip mount as claimed in claim 8 including a locking latch between said cam actuator and said body.

14. A clip mount as claimed in claim 13 wherein said locking latch includes a flexible stem mounted to said body and a latch surface, said cam actuator including a latch interface coacting with said latch surface and limiting movement of said cam actuator when said latch interface is adjacent said latch surface.

15. A clip mount as claimed in claim 14 wherein said body has proximal upper end and a distal lower end, said cam actuator having an actuator proximal end which extends above the body's proximal end, said locking latch having a user actuation surface disposed on said stem which extends above said actuator proximal end.

16. A clip mount as claimed in claim 1 including a plastic leaf spring formed as a hook with a fore end, a curvaceous mid-section and an elongated leg member, said fore end mounted to said body, said leg member having a proximal pivot member and a distal leg region; and
   a clip arm having a capture channel for said distal leg region and a complementary pivot member coacting with said proximal pivot member such that said body pivots with respect to said clip arm and said elongated leg member bows.

17. A clip mount as claimed in claim 15 including a plastic leaf spring formed as a hook with a fore end, a curvaceous mid-section and an elongated leg member, said fore end mounted to said body, said leg member having a proximal pivot member and a distal leg region; and
   a clip arm having a capture channel for said distal leg region and a complementary pivot member coacting with said proximal pivot member such that said body pivots with respect to said clip arm and said elongated leg member bows.

18. A clip mount for a cell phone or personal electronic device attachment system with a button mount, said clip mount comprising:
   a body defining a locking cavity for said button;
   a resilient locking tongue disposed in said locking cavity adapted to bias said button into a locking position in said locking cavity, said resilient locking tongue having a first and a second cam surface; and
   a cam actuator movably mounted within said body and having a first and a second cam actuator surface respectively coacting with said first and second cam surfaces wherein,
   in a first actuator position, said second cam actuator surface and said second cam surface biases said resilient locking tongue to lock said button into said locking position and,
   in a second actuator position, said first cam actuator surface and said first cam surface move said resilient locking tongue and unlock and release said button.

19. A clip mount as claimed in claim 18 wherein said cam actuator is biased towards said first position.

20. A clip mount as claimed in claim 19 wherein said body is generally rectangular and said cam actuator is elongated and moves longitudinally in said rectangular body.

21. A clip mount as claimed in claim 20 including a resilient member, disposed between said cam actuator and said body, biasing said cam actuator towards said first position.

22. A clip mount as claimed in claim 21 wherein resilient member is a plastic and said body, tongue and cam actuator are plastic.

23. A clip mount as claimed in claim 22 wherein the entire clip mount is plastic.

24. A clip mount as claimed in claim 21 wherein said resilient member is a flexible leg mounted in said body and said cam actuator includes a stop coacting with said flexible leg.

25. A clip mount as claimed in claim 21 wherein said resilient member is a flexible leg mounted on said cam actuator and said body includes a stop coacting with said flexible leg.

26. A clip mount as claimed in claim 18 including a locking latch between said cam actuator and said body.

27. A clip mount as claimed in claim 26 wherein said locking latch includes a flexible stem mounted to said body and a latch surface, said cam actuator including a latch interface coacting with said latch surface and limiting movement of said cam actuator when said latch interface is adjacent said latch surface.

28. A clip mount as claimed in claim 27 wherein said body has proximal upper end and a distal lower end, said body is generally rectangular and said cam actuator is elongated and moves longitudinally in said rectangular body, said cam actuator having an actuator proximal end which extends above the body's proximal end, said locking latch having a user actuation surface disposed on said stem which extends above said actuator proximal end.

29. A clip mount as claimed in claim 25 including a locking latch between said cam actuator and said body.

30. A clip mount as claimed in claim 29 wherein said locking latch includes a flexible stem mounted to said body and a latch surface, said cam actuator including a latch interface coacting with said latch surface and limiting movement of said cam actuator when said latch interface is adjacent said latch surface.

31. A clip mount as claimed in claim 30 wherein said body has proximal upper end and a distal lower end, said cam actuator having an actuator proximal end which extends above the body's proximal end, said locking latch having a user actuation surface disposed on said stem which extends above said actuator proximal end.

32. A clip mount as claimed in claim 18 including a plastic leaf spring formed as a hook with a fore end, a curvaceous mid-section and an elongated leg member, said fore end mounted to said body, said leg member having a proximal pivot member and a distal leg region; and
   a clip arm having a capture channel for said distal leg region and a complementary pivot member coacting with said proximal pivot member such that said body pivots with respect to said clip arm and said elongated leg member bows.

33. A clip mount as claimed in claim 31 including a plastic leaf spring formed as a hook with a fore end, a curvaceous mid-section and an elongated leg member, said fore end mounted to said body, said leg member having a proximal pivot member and a distal leg region; and
   a clip arm having a capture channel for said distal leg region and a complementary pivot member coacting with said proximal pivot member such that said body pivots with respect to said clip arm and said elongated leg member bows.

34. A method of mounting a cell phone or personal electronic device attachment system with a protruding button mount onto a clip mount comprising:
   providing a clip mount body defining a complementary locking cavity for said button and a resilient locking tongue disposed in said complementary locking cavity;
   biasing said button into a locking position in said locking cavity;
   providing a sloped cam surface on said resilient locking tongue;
   moving a second cam surface over the locking tongue cam surface thereby flexing said resilient locking tongue from a first locking position to a second button release position;
   controllably locking and latching said second cam surface in said locking position.

* * * * *

UNITED STATES PATENT AND TRADEMARK OFFICE
CERTIFICATE OF CORRECTION

| | | |
|---|---|---|
| PATENT NO. | : 7,421,073 B2 | |
| APPLICATION NO. | : 11/156861 | |
| DATED | : September 2, 2008 | |
| INVENTOR(S) | : Fernando Tages | |

It is certified that error appears in the above-identified patent and that said Letters Patent is hereby corrected as shown below:

On the Title Page Item (75)

Delete "Harold A. Goradesky" as one of the inventors

Signed and Sealed this
Twenty-first Day of June, 2011

David J. Kappos
*Director of the United States Patent and Trademark Office*